United States Patent
Arakawa et al.

(10) Patent No.: US 8,339,125 B2
(45) Date of Patent: Dec. 25, 2012

(54) MAGNETIC POLE POSITION DETECTING DEVICE AND METHOD

(75) Inventors: Takemasa Arakawa, Chiyoda-ku (JP); Shuya Sano, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 185 days.

(21) Appl. No.: 12/937,165

(22) PCT Filed: Apr. 9, 2008

(86) PCT No.: PCT/JP2008/057006
§ 371 (c)(1),
(2), (4) Date: Oct. 8, 2010

(87) PCT Pub. No.: WO2009/125479
PCT Pub. Date: Oct. 15, 2009

(65) Prior Publication Data
US 2011/0031962 A1    Feb. 10, 2011

(51) Int. Cl.
*G01B 7/30* (2006.01)
(52) U.S. Cl. .................. 324/207.24; 324/207.14
(58) Field of Classification Search ............. 324/207.24, 324/207.14
See application file for complete search history.

(56) References Cited

U.S. PATENT DOCUMENTS

| | | | |
|---|---|---|---|
| 5,023,495 A * | 6/1991 | Ohsaka et al. ............. 310/12.15 |
| 7,170,283 B2 * | 1/2007 | Toyozawa et al. ....... 324/207.25 |
| 7,352,151 B2 * | 4/2008 | Fujitsuna et al. ............. 318/721 |
| 2004/0066205 A1 | 4/2004 | Imai et al. |

FOREIGN PATENT DOCUMENTS

| | | |
|---|---|---|
| CN | 1930771 A | 3/2007 |
| JP | 60-180468 A | 9/1985 |
| JP | 04-069088 A | 3/1992 |
| JP | 2001-078392 A | 3/2001 |
| JP | 2002-142489 A | 5/2002 |

OTHER PUBLICATIONS

German Office Action, dated May 9, 2012, 11 2008 003 786.8.
Chinese Office Action, dated Aug. 23, 2012.

* cited by examiner

*Primary Examiner* — Reena Aurora
(74) *Attorney, Agent, or Firm* — Sughrue Mion, PLLC

(57) ABSTRACT

A magnetic pole position detecting device correctly acquires magnetic pole position even if two magnetic sensors are arranged at an arbitrary interval. The magnetic pole position detecting device receives the input of sensor outputs "a" and "b" of two magnetic sensors arranged at a predetermined interval L along a magnetic pole arraying direction and a phase difference $\phi$ between the two sensor outputs "a" and "b". When $\sin\phi > \delta$, the magnetic pole position detecting device divides $a \cdot \sin\phi$ by $b - a \cdot \cos\phi$ to calculate $\tan\theta$ and outputs a magnetic pole position $\theta = \tan^{-1}\{a \cdot \sin\phi/(b - a \cdot \cos\phi)\}$. When $\sin\phi \leq \delta$, because $a = \sin\theta$ and $b = \cos(\theta + \phi)$, the magnetic pole position detecting device outputs magnetic pole position $\theta = \{\sin^{-1}(a) + \sin^{-1}(b) - \phi\}/2$. Because $\phi = 2\pi \times L/(a$ magnetic pole pitch or the number of poles), by using $\phi$ as a correction coefficient for the two sensor outputs "a" and "b", magnetic pole position error can be canceled even when the interval L is different from a theoretical value.

6 Claims, 5 Drawing Sheets

MAGNETIC POLE POSITION DETECTING DEVICE AND METHOD

CROSS REFERENCE TO RELATED APPLICATIONS

This application is a National Stage of International Application No. PCT/JP2008/057006, filed on Apr. 9, 2008, the content of which is incorporated herein by reference in its entirety.

TECHNICAL FIELD

The present invention relates to a magnetic pole position detecting device and a magnetic pole position detecting method for detecting a magnetic pole position where a movable unit of a motor is located.

BACKGROUND ART

A magnetic pole structure of a motor is, in a linear motor, a structure in which a plurality of magnets having certain length (magnetic pole pitch) are linearly arrayed with polarities thereof set different from one another. In a rotary motor (a brushless motor, etc.), the magnetic pole structure is a structure in which a predetermined number of magnetic poles having polarities different from one another are annularly arrayed to form a predetermined number of poles.

In the linear motor and the rotary motor (the brushless motor, etc.), to detect magnetism in a magnetic pole position where a movable unit is located, two or more magnetic sensors that detect an amount of change corresponding to a distance of a magnetic flux generated by a magnetic pole are arranged at a certain interval along a magnetic pole arraying direction of the motor.

A magnetic pole position detecting device is an apparatus that calculates and detects, based on a phase difference between sensor outputs of two magnetic sensors among the two or more magnetic sensors, the magnetic pole position where the movable unit is located.

In the linear motor, the magnetic pole position detecting device is mounted to obtain position information indicating in which position (magnetic pole position) in a magnetic pole pitch the movable unit is located when the movable unit moves in a magnet arraying direction. Specifically, the magnetic pole position detecting device used in the linear motor includes two magnetic sensors in the device. On the other hand, in the rotary motor, the two or more magnetic sensors form a part of components of the motor. The magnetic pole position detecting device is provided on the outside of the motor.

Concerning an arrangement interval of the two magnetic sensors, in the past, the two magnetic sensors are arranged such that a phase difference between sensor outputs is 90 degrees (e.g., Patent Documents 1 and 2).

Then, in the example of the linear motor, the following relation holds between an arrangement interval L of the two magnetic sensors and a magnetic pole pitch PIT:

$$L=PIT/4 \qquad (1)$$

In the rotary motor, the arrangement pitch L is represented by an electrical angle as follows:

$$L=180°/\text{number of poles}$$

Output waveforms of the magnetic sensors are formed in sine wave shapes. Therefore, when the two magnetic sensors are arranged to satisfy the constraint of Formula (1), if a sensor output on an advanced phase side is represented as "a" and a sensor output on a delay phase side is represented as "b", the sensor output "a" can be regarded as a sine wave and the sensor output "b" can be regarded as a cosine wave. A magnetic pole position can be obtained by calculating a tangent value of the sensor outputs "a" and "b".

Specifically, if the magnetic pole position is represented as $\theta$, because $\tan\theta=a/b$, the magnetic pole position $\theta$ can be calculated as follows:

$$\theta=\tan^{-1}(a/b) \qquad (2)$$

A processing block in this case, i.e., a magnetic pole position detecting device in the past includes a divider that calculates a/b and a $\tan^{-1}$ angle operator that calculates an arctangent value from the tangent value $\tan\theta$ calculated by the divider.

Patent Document 1: Japanese Patent Application Laid-open No. S60-180468 (FIG. 3)
Patent Document 2: Japanese Patent Application Laid-open No. 2001-78392 (FIG. 1)

DISCLOSURE OF INVENTION

Problem to be Solved by the Invention

However, the arrangement interval of the two magnetic sensors in the magnetic pole position detecting device in the past cannot be arbitrarily set. As it is understood from the constraint of Formula (1), in the linear motor, there is constraint that the arrangement interval depends on the magnetic pole pitch and, in the rotary motor, there is constraint that the arrangement interval depends on the number of poles.

Therefore, when there is an error in attachment positions of the magnetic sensors, troublesome correction processing is necessary. In the magnetic pole position detecting device mounted on the linear motor, because the size of the device depends on the magnetic pole pitch, a reduction in size of the apparatus is difficult. The magnetic pole position detecting device cannot be shared among linear motors having different magnetic pole pitches.

The present invention has been devised in view of the above and it is an object of the present invention to obtain a magnetic pole position detecting device and a magnetic pole position detecting method that can correctly acquire a magnetic pole position even if the two magnetic sensors are arranged at an arbitrary interval.

Means for Solving Problem

In order to achieve the above object, a magnetic pole position detecting device according to one aspect of the present invention is constructed in such a manner as to calculate and detect, based on a phase difference between sensor outputs of two magnetic sensors among two or more magnetic sensors arranged at predetermined intervals along a magnetic pole arraying direction of a motor, a magnetic pole position where a movable unit is located, wherein the magnetic pole position detecting device comprises: a first operation system that detects, when an advanced phase side sensor output of the two sensor outputs is represented as "a", a delay phase side sensor output is represented as "b", and the phase difference is represented as $\phi$, a magnetic pole position $\theta$ in the case of a sine value of the phase difference larger than a determination threshold by performing a following arithmetic operation: $\theta=\tan^{-1}\{(a\cdot\sin\phi/(b-a\cdot\cos\phi)\}$; and a second operation system that detects the magnetic pole position $\theta$ in the case of a sine value of the phase difference smaller than the determination threshold by performing a following arithmetic operation: θ={sin⁻¹(a)+sin⁻¹(b)−ϕ}/2.

Effect of the Invention

According to the present invention, there is an effect that it is possible to obtain a magnetic pole position detecting device that can correctly acquire a magnetic pole position even if the two magnetic sensors are arranged at an arbitrary interval.

EXPLANATIONS OF LETTERS OR NUMERALS

Figure 1:
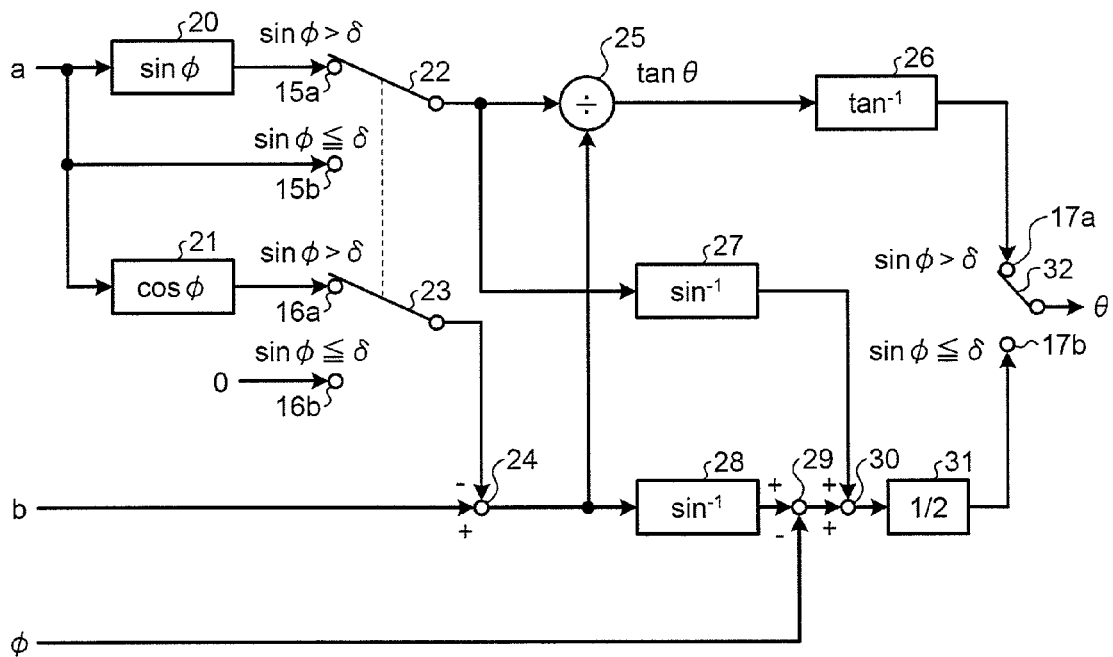
FIG. 1 is a block diagram of the configuration of a magnetic pole position detecting device according to an embodiment of the present invention.

1 Magnetic pole position detecting device
2 Linear motor
3 Guide
4 Magnet
11, 12, 13 Magnetic sensors
20, 21, 31 Multipliers
22, 23, 32 Selecting circuits
24, 29 Subtractors
25 Divider
26, 27, 28 Angle operators
30 Adder
a, b Sensor outputs
ϕ Phase difference (correction coefficient)
Best Mode(S) for Carrying Out the Invention A preferred embodiment of a magnetic pole position detecting device and a magnetic pole position detecting method according to the present invention is explained in detail below with reference to the drawings.

FIG. 1 is a block diagram of the configuration of a magnetic pole position detecting device according to an embodiment of the present invention. In this embodiment, the magnetic pole position detecting device is explained as being mounted on a linear motor and used. However, the magnetic pole position detecting device can also be used in a rotary motor.

As shown in FIG. 1, the magnetic pole position detecting device according to this embodiment is an apparatus that receives the input of sensor outputs "a" and "b" of two magnetic sensors and a phase difference ϕ between the sensor outputs "a" and "b" and calculates and outputs, based on the sensor outputs "a" and "b" and the phase difference ϕ, a magnetic pole position θ.

The magnetic pole position detecting device shown in FIG. 1 includes multipliers 20 and 21, selecting circuits 22 and 23, a subtractor 24, a divider 25, angle operators 26, 27, and 28, a subtractor 29, an adder 30, a multiplier 31, and a selecting circuit 32. Although not shown in the figure, the magnetic pole position detecting device includes a phase-difference calculating unit that calculates the phase difference ϕ according to Formula (3) described below.

Figure 2:
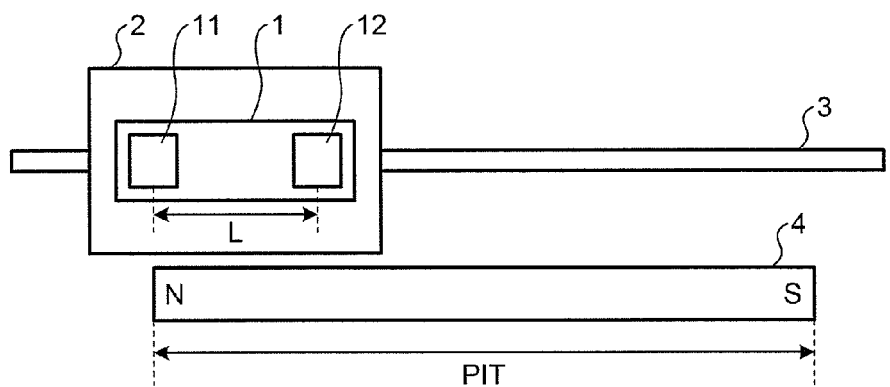
FIG. 2 is a diagram for explaining a principle of magnetic pole position detection according to the present invention of a magnetic pole position detecting device mounted on a linear motor.
Figure 3:
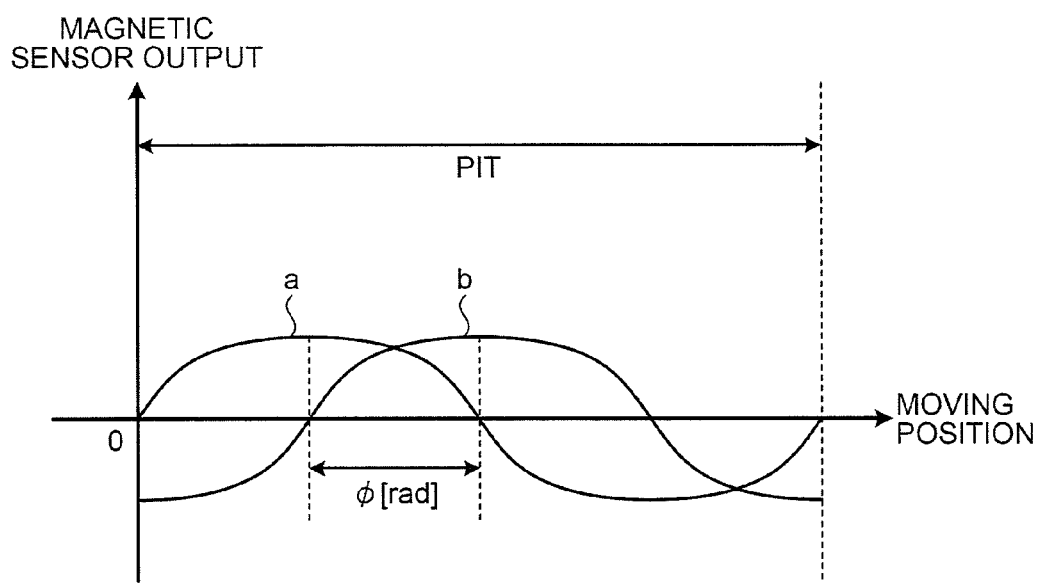
FIG. 3 is a waveform chart of output waveforms of two magnetic sensors included in the magnetic pole position detecting device shown in FIG. 2.

The magnetic pole position detecting device is configured based on a principle explained below. The principle is explained with reference to FIGS. 2 and 3. FIG. 2 is a diagram for explaining a principle of magnetic pole position detection according to the present invention of the magnetic pole position detecting device mounted on the linear motor. FIG. 3 is a waveform chart of output waveforms of two magnetic sensors included in the magnetic pole position detecting device shown in FIG. 2.

In FIG. 2, a linear motor 2 mounted with a magnetic pole position detecting device 1 can move in an arraying direction of a magnet 4 having certain length (magnetic pole pitch) while being guided by a guide 3. In the magnetic pole position detecting device 1, two magnetic sensors 11 and 12 are arranged at an interval L in the arraying direction of the magnet 4. Therefore, when the magnetic pole position detecting device 1 is located in a certain position, output values of the magnetic sensors 11 and 12 are different values because distances from an N pole are different.

When the magnetic pole position detecting device 1 moves along the guide 3, outputs (sensor outputs) "a" and "b" of the magnetic sensors 11 and 12 are formed in, as shown in FIG. 3, sine wave shapes having a fixed phase difference ϕ [rad] according to a moving position of the magnetic pole position detecting device 1. The phase difference ϕ between the sensor outputs "a" and "b" depends on a magnetic pole pitch PIT and the arrangement interval L of the magnetic sensors 11 and 12 and can be represented as follows:

$$\phi = 2\pi \times L/PIT [\text{rad}] \quad (3)$$

If it is assumed that the sensor output "a" is an output of the magnetic sensor 11 arranged on an advanced phase side and the sensor output "b" is an output of the magnetic sensor 12 arranged on a delay phase side, a phase of the output "b" of the magnetic sensor 12 is delayed by ϕ=2π×L/PIT [rad] compared with the output "a" of the magnetic sensor 11. When a magnetic pole position at this point is represented as θ, a tangent value tan θ=a/b is calculated as follows:

$$a/b = \sin\theta/\sin(\theta+\phi) = a/(a\cdot\cos\phi + \cos\theta\sin\phi)$$

Therefore, a cosine value cos θ of the magnetic pole position θ can be calculated as follows:

$$\cos\theta = (b - a\cdot\cos\phi)/\sin\phi \quad (4)$$

In the magnetic pole position detecting method in the past, because the outputs "a" and "b" of the magnetic sensors 11 and 12 have a phase difference of 90 degrees, φ=90°. When this is applied to Formula (4), cos θ=b. In this way, Formula (4) is the extension of the method in the past.

The magnetic pole position θ is calculated from the tangent value tan θ in the same manner as the method in the past as follows:

$$\tan θ = \sin θ/\cos θ = a/\cos θ = a \cdot \sin φ/(b - a \cdot \cos φ)$$

Therefore, the magnetic pole position θ can be calculated as follows:

$$θ = \tan^{-1}\{a \cdot \sin φ/(b - a \cdot \cos φ)\} \quad (5)$$

Formula (5) indicates that the magnetic pole position θ is obtained if the tangent value tan θ of a magnetic pole position is calculated from the sensor outputs "a" and "b" by using the phase difference φ obtained from the magnetic pole pitch and the arrangement interval of the magnetic sensors 11 and 12 as a correction coefficient for the sensor outputs "a" and "b".

However, in Formula (5), because tan θ=0 under a condition that sin φ=0, cos θ cannot be calculated from Formula (4). Actually, when sin φ<<1, the arrangement interval L of the magnetic sensors 11 and 12 is extremely small compared with the magnetic pitch PIT and values of the sensor outputs "a" and "b" of the magnetic sensors 11 and 12 are substantially the same. Therefore, it is difficult to calculate tan θ from Formula (5) to calculate the magnetic pole position θ. When the arrangement interval L of the magnetic sensors 11 and 12 is an integer time as large as the magnetic pole pitch PIT, similarly, sin φ=0. Therefore, it is difficult to calculate tan θ from Formula (5) to calculate the magnetic pole position θ.

In such a case, the value sin θ is directly calculated from the sensor outputs "a" and "b" to calculate the magnetic pole position θ. Specifically, from a relation of a=sin θ and b=sin (θ+φ), the following formulas are obtained:

$$θ = \sin^{-1}(a)$$

$$θ = \sin^{-1}(b) - φ$$

Therefore, the two formulas are deformed as follows such that magnetic pole position θ can be calculated by using the two sensor outputs "a" and "b":

$$θ = \{\sin^{-1}(a) + \sin^{-1}(b) - φ\}/2 \quad (6)$$

Consequently, when sin φ is small, the magnetic pole position θ can be calculated by directly calculating sin θ from the sensor outputs "a" and "b".

In the case of the rotary motor, the magnetic pole pitch PIT is set as the number of poles and the arrangement interval L, the phase difference 4, and the magnetic pole position θ are respectively considered as electrical angles. Consequently, a magnetic pole position can be calculated by a procedure same as that explained above.

FIG. 1 is a diagram in which the contents explained above are arranged and shown in a form of processing blocks. In FIG. 1, a value δ is a determination threshold for determining, according to the magnitude of sin φ=sin(2π×L/PIT), whether tan θ is calculated according to Formula (5) to calculate the magnetic pole position θ or the magnetic pole position θ is calculated from sin θ according to Formula (6). The determination threshold δ is a design value set in a range of 0<δ<<1.

The multiplier 20 outputs "a·sin φ" obtained by multiplying the sensor output "a" by sin φ to one input end 15a of the selecting circuit 22. The multiplier 21 outputs "a·cos φ" obtained by multiplying the sensor output "a" by cos φ to one input end 16a of the selecting circuit 23. The sensor output "a" is directly input to the other input end 15b of the selecting circuit 22. A value 0 is input to the other input end 16b of the selecting circuit 23.

An output of the selecting circuit 22 is input to one input end of the divider 25 and the angle operator 27. An output of the selecting circuit 23 is input to one input end of the subtractor 24. The subtractor 24 outputs a value obtained by subtracting the output of the selecting circuit 23 from the sensor output "b", which is the other input, to the other input end of the divider 25 and the angle operator 28.

The angle operator 26 applies an angle operation of "$\tan^{-1}$" to an output "tan θ" of the divider 25 to calculate an arctangent value (a magnetic pole position) θ and outputs the arctangent value θ to one input end 17a of the selecting circuit 32.

The angle operator 28 applies an angle operation of "$\sin^{-1}$" to the output of the subtractor 24 and outputs a calculated arcsine value to one input end of the subtractor 29. The subtractor 29 outputs a value obtained by subtracting the phase difference φ, which is the other input, from the output of the angle operator 28 to one input end of the adder 30.

The angle operator 27 applies an angle operation of "$\sin^{-1}$" to the output of the selecting circuit 22 and outputs a calculated arcsine value to the other input end of the adder 30. The multiplier 31 outputs a value obtained by multiplying "(the output of the subtractor 29"+"the output of the angle operator 27)" output by the adder 30 by ½ to the other input end 17b of the selecting circuit 32.

In the above configuration, when sin φ>δ, the selecting circuits 22, 23, and 32 respectively select one input ends 15a, 16a, and 17a. When sin φ≦δ, the selecting circuits 22, 23, and 32 respectively select the other input ends 15b, 16b, and 17b.

Then, when sin φ>δ, the output of the selecting circuit 22 is a·sin φ and the output of the selecting circuit 23 is a·cos φ. The output of the subtractor 24 is b−a·cos φ. The output of the divider 25 is a·sin φ/(b−a·cos φ)=tan θ. Therefore, as the output of the angle operator 26, the magnetic pole position θ by the arithmetic operation of Formula (5) is obtained.

On the other hand, when sin φ≦δ, the output of the selecting circuit 22 is the sensor output "a" and the output of the selecting circuit 23 is the value 0. The output of the subtractor 24 is the sensor output "b". The output of the angle operator 27 is θ=sin⁻¹(a). The output of the angle operator 28 is θ=sin⁻¹(b). The output of the subtractor 29 is θ=sin⁻¹(b)−φ. The output of the adder 30 is 2θ={sin⁻¹(a)+sin⁻¹(b)−φ}. Therefore, as the output of the multiplier 31, the magnetic pole position θ by the arithmetic operation of Formula (6) is obtained.

It is seen that, with the configuration shown in FIG. 1, the magnetic pole position θ can be calculated at an arbitrary arrangement interval L. Even when the arrangement interval L deviates from a theoretical value in the attachment of the magnetic sensors 11 and 12, an error of the arrangement interval L due to the attachment can be corrected without special correction processing by using the phase difference φ as a correction coefficient.

Specifically, when the arrangement interval L deviates from the theoretical value in the attachment of the magnetic sensors 11 and 12, it is sufficient to measure an actual arrangement interval L or calculate an error in an attachment position from observation of a magnetic pole position error waveform and estimate the actual arrangement interval L to calculate an actual value of the arrangement interval L and apply the phase difference φ, which is calculated by applying the actual value to Formula (3), to φ in FIG. 1. In other words, even if there is an error in the arrangement interval L, if the correction coefficient φ is appropriately calculated as explained above and applied to the configuration shown in FIG. 1, a correct magnetic pole position is automatically obtained. Various specific forms are explained below as examples.

EXAMPLE 1

Figure 4:
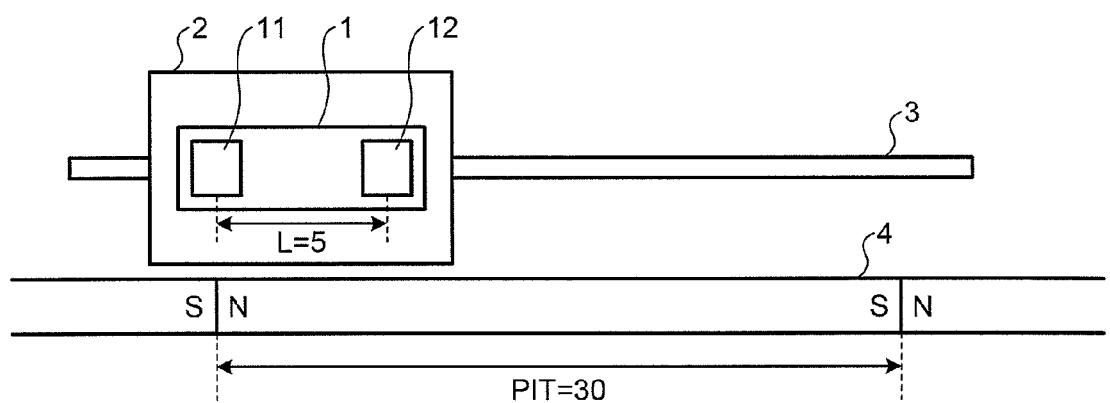
FIG. 4 is a diagram for explaining magnetic pole position detecting operation performed when an arrangement interval is set to 5 mm and a magnetic pole pitch is set to 30 mm in the configuration shown in FIG. 2.
Figure 5:
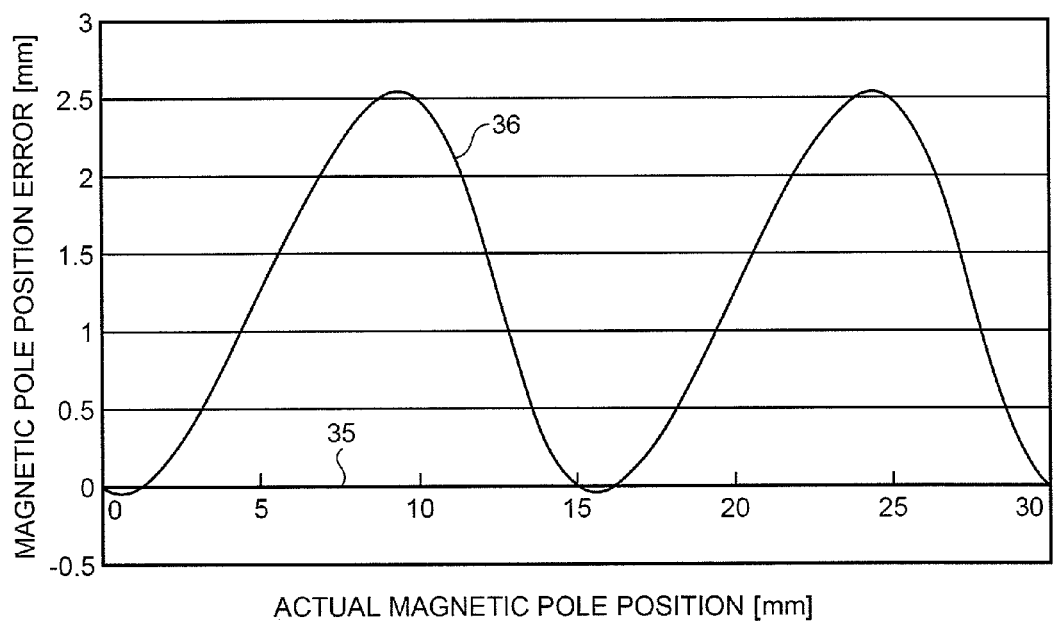
FIG. 5 is a graph of a simulation result under the conditions shown in FIG. 4 compared with a simulation result of the method in the past.

FIG. 4 is a diagram for explaining magnetic pole position detecting operation performed when an arrangement interval is set to 5 mm and a magnetic pole pitch is set to 30 mm in the configuration shown in FIG. 2. FIG. 5 is a graph of a simulation result under the conditions shown in FIG. 4 compared with a simulation result of the method in the past.

When the arrangement interval L is 5 mm and the magnetic pole pitch PIT is 30 mm, the correction coefficient φ is calculated as φ=2π×5/30=π/3 [rad] from Formula (3). The correction coefficient φ=π/3 is applied to the configuration shown in FIG. 1 to calculate the magnetic pole position θ.

In FIG. 5, the abscissa represents an actual magnetic pole position [mm] and the ordinate represents a magnetic pole position error [mm]. In FIG. 5, reference numeral 35 indicates a characteristic obtained when magnetic pole position detection is performed by a method of this example employing the configuration shown in FIG. 1. Reference numeral 36 indicates a characteristic obtained when magnetic pole position detection is performed by the method in the past under the conditions of Formula (2).

As shown in FIG. 5, it is seen that, when the correction coefficient φ is set to π/3, with the method of this example, the magnetic pole position error is reduced to zero and a magnetic pole position can be correctly detected. On the other hand, it is seen that, in the method in the past, an error occurs in a magnetic pole position and a correct magnetic pole position cannot be obtained. This is because, in the method in the past, a relation between a magnetic pole pitch and an arrangement interval does not satisfy the constraint of Formula (2).

In this case, to make it possible to correctly detect a magnetic pole position with the method in the past, it is necessary to set the arrangement interval L to 7.5 mm that is ¼ of the magnetic pole pitch PIT. In other words, the use of the method of this example enables magnetic pole position detection even at an arrangement interval of 5 mm shorter than 7.5 mm. Therefore, it is possible to realize a reduction in size of the magnetic pole position detecting device 1.

EXAMPLE 2

Figure 6:
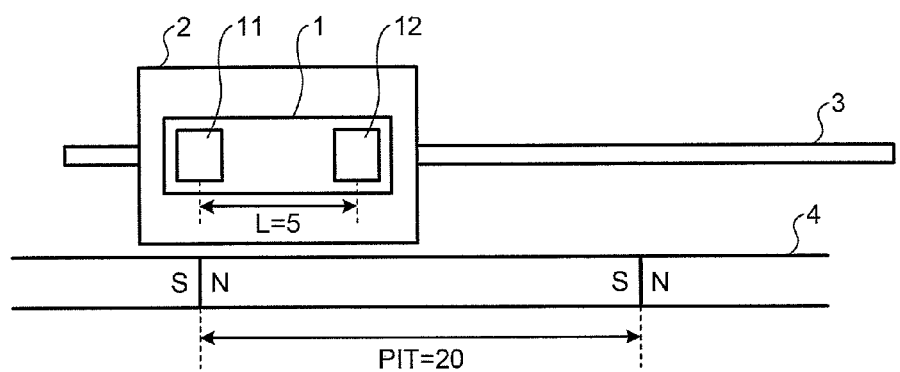
FIG. 6 is a diagram for explaining magnetic pole position detecting operation performed when an arrangement interval is set to 5 mm and a magnetic pole pitch is set to 20 mm in the configuration shown in FIG. 2.
Figure 7:
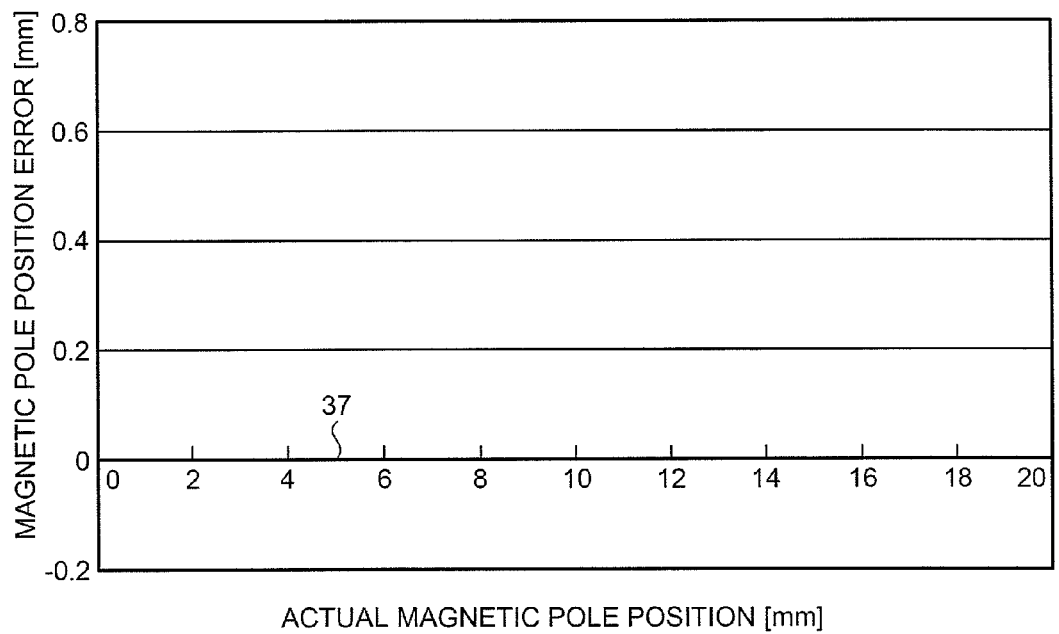
FIG. 7 is a graph of a simulation result under the conditions shown in FIG. 6 compared with a simulation result of the method in the past.

FIG. 6 is a diagram for explaining magnetic pole position detecting operation performed when an arrangement interval is set to 5 mm and a magnetic pole pitch is set to 20 mm in the configuration shown in FIG. 2. In other words, in FIG. 6, only the magnetic pole pitch is set different from that in Example 1. FIG. 7 is a graph of a simulation result under the conditions shown in FIG. 6 compared with a simulation result of the method in the past.

When the arrangement interval L is 5 mm and the magnetic pole pith PIT is 20 mm, the correction coefficient φ is calculated as φ=2π×5/20=π/2 [rad] from Formula (3). The correction coefficient φ=π/2 is applied to the configuration shown in FIG. 1 to calculate the magnetic pole position θ.

In FIG. 7, the abscissa represents an actual magnetic pole position [mm] and the ordinate represents a magnetic pole position error [mm]. In FIG. 7, reference numeral 37 indicates a characteristic obtained when magnetic pole position detection is performed by a method of this example employing the configuration shown in FIG. 1 and a characteristic obtained when magnetic pole position detection is performed by the method in the past under the conditions of Formula (2).

As shown in FIG. 7, it is seen that, with the method of this example, the magnetic pole position error is zero even when the correction coefficient φ is set to π/2 and a magnetic pole position can be correctly detected. Similarly, with the method in the past, magnetic pole position detection can be correctly performed and a magnetic pole position error is zero. This is because, in the conditions shown in FIG. 6, the arrangement interval is ¼ of the magnetic pole pitch and the constraint of Formula (2) used in the method in the past is satisfied.

As explained above, in the method of this example, as shown in FIGS. 4 and 6, even if magnetic pole pitches are different, a magnetic pole position error can be reduced to zero if the correction coefficient φ is appropriately set. On the other hand, in the method in the past, because the constraint of Formula (2) is not satisfied by the conditions shown in FIG. 4, a magnetic pole position cannot be correctly calculated and a magnetic pole position error occurs.

Therefore, in the method of this example, even among linear motors having different magnetic pole pitches, it is possible to detect a magnetic pole position using a common magnetic pole position detecting device by appropriately setting the correction coefficient φ.

EXAMPLE 3

Figure 8:
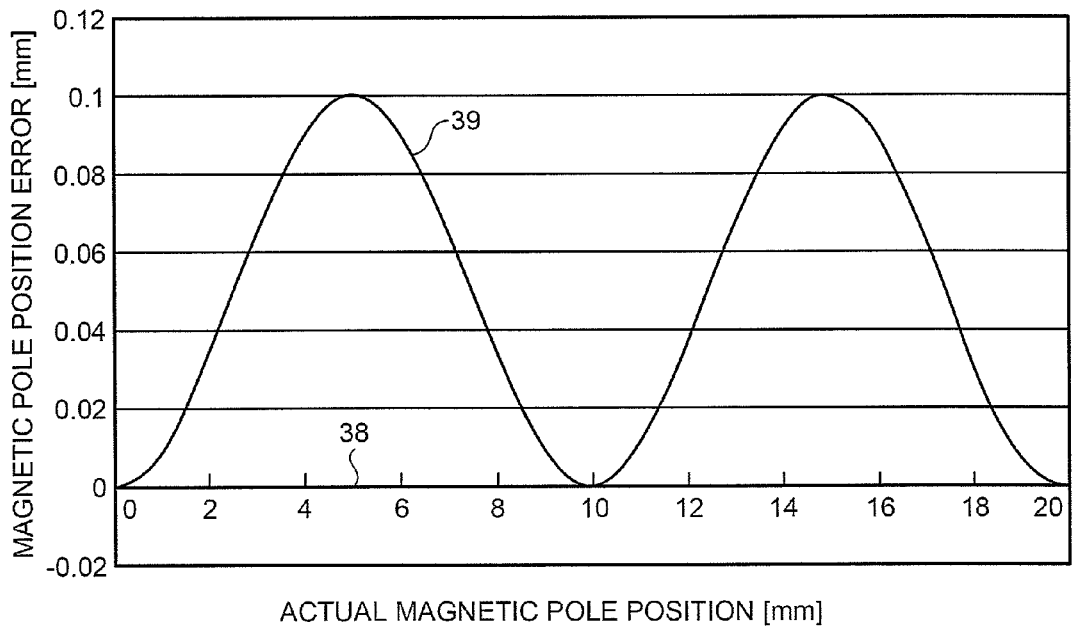
FIG. 8 is a graph of a simulation result of a magnetic pole position obtained by calculating a correction coefficient when an arrangement interval deviates from a theoretical value in the configuration shown in FIG. 2 compared with a simulation result of the method in the past.

FIG. 8 is a graph of a simulation result of a magnetic pole position obtained by calculating a correction coefficient when an arrangement interval deviates from a theoretical value in the configuration shown in FIG. 2 compared with a simulation result of the method in the past. In FIG. 8, a characteristic 38 and a characteristic 39 are shown. The characteristic 38 is a characteristic obtained by performing correction with a method of this example when, although a theoretical value of the arrangement interval L is 5 mm shown in FIG. 6, an actual arrangement interval is 4.9 mm. The characteristic 39 is a characteristic obtained when magnetic pole position detection is performed from the sensor outputs "a" and "b" of the magnetic sensors 11 and 12 by the method in the past under the conditions of Formula (2). In FIG. 8, the abscissa represents an actual magnetic pole position [mm] and the ordinate represents a magnetic pole position error [mm].

In the case of the conditions shown in FIG. 6, theoretically, the constraint of Formula (2) is satisfied even in the method in the past. Therefore, as shown in FIG. 7, magnetic pole position detection can be correctly performed. In this example, there is an error in actual attachment. Therefore, actually, the constraint of Formula (2) is not satisfied.

Therefore, when a magnetic pole position is calculated according to Formula 2 as the method in the past, regardless of the fact that a phase of the sensor output "b" is actually more advanced than the theoretical value, the sensor output "b" is treated as cos θ. Therefore, as indicated by the characteristic 39, a maximum error of about 5.0−4.9=0.1 mm occurs.

On the other hand, with the method of this example, it is possible to correct an error due to attachment by measuring an arrangement interval of magnetic sensors after attachment or estimating an arrangement interval of the magnetic sensors after the attachment from an amplitude value of a magnetic pole position error waveform to acquire an actual arrangement interval, applying the actual arrangement interval to Formula (3) to calculate the correction coefficient φ, and applying the correction coefficient φ to the configuration shown in FIG. 1. In this example, the attachment error is corrected by giving φ=2π×4.9/20=1.53938 to the correction coefficient φ. Therefore, as indicated by the characteristic 38, a magnetic pole position error is reduced to zero.

In this way, it is seen that, when the arrangement interval of the magnetic sensors deviates from the theoretical value, an error is cancelled by appropriately setting the correction coefficient φ with the method of this example.

EXAMPLE 4

Figure 9:
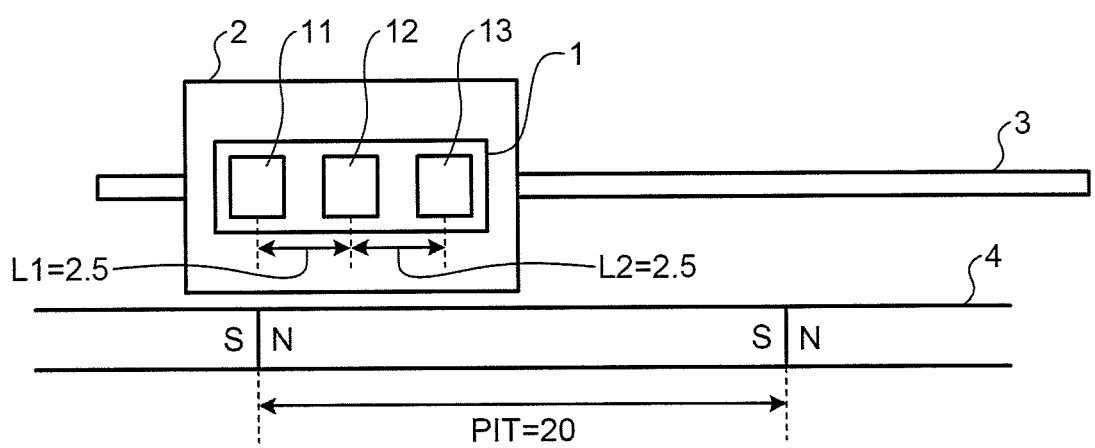
FIG. 9 is a diagram for explaining a method of performing magnetic pole position detection using three magnetic sensors.

FIG. 9 is a diagram for explaining a method of performing magnetic pole position detection using three magnetic sensors. When the method of this example is used, because there is no constraint concerning positions of the magnetic sensors, the magnetic pole position detection can be performed by using three or more magnetic sensors.

For example, as shown in FIG. 9, a third magnetic sensor 13 is added, the magnetic sensors 11 and 12 are arranged in positions at an interval L1=2.5 mm, and the magnetic sensors 12 and 13 are arranged in positions at the interval L2=2.5 mm. Detection of a magnetic pole position is performed by combining the three magnetic sensors.

Specifically, a magnetic pole position θ12 is calculated by using the magnetic sensor 11 and the magnetic sensor 12, a magnetic pole position θ13 is calculated by using the magnetic sensor 11 and the magnetic sensor 13, a magnetic pole position θ23 is calculated by using the magnetic sensor 12 and the magnetic sensor 13, and the magnetic pole position θ is calculated as follows:

$$\theta=(\theta12+\theta13+\theta23)/3$$

In this way, for example, the three magnetic sensors can be used in combination. Therefore, it is possible to relax influence due to noise or the like and improve detection accuracy. Even when one of the three magnetic sensors is broken, the magnetic pole position detection can be performed by the remaining two magnetic sensors. Therefore, it is possible to improve reliability of the magnetic pole position detecting device.

As explained above, according to this embodiment, values of the two sensor outputs are corrected by using, as the correction coefficient, the phase difference φ calculated according to Formula (3) for defining the relation between the arrangement interval of the two magnetic sensors and the magnetic pole pitch (the number of poles in the rotary motor). Therefore, it is possible to realize a magnetic pole position detecting device without constraint between the magnetic pole pitch (the number of poles in the rotary motor) and the arrangement interval of the magnetic sensors.

The magnetic pole position detecting device adopts a configuration explained below as a configuration for receiving the input of the two sensor outputs and the phase difference φ, which is the correction coefficient, and calculating and detecting the magnetic pole position θ. The magnetic pole position detecting device switches the calculation and detection of the magnetic pole position θ to calculate and detect, when a sine value of the phase difference φ is larger than the determination threshold δ set in the range of 1>>δ>0, the magnetic pole position θ according to Formula (5) and calculate and detect, when the sine sin φ of the phase difference φ is smaller than the determination threshold δ, the magnetic pole position θ according to Formula (6). Therefore, a magnetic pole position can be detected at an arbitrary arrangement interval of the two magnetic sensors.

Therefore, even when there is an error in attachment of the two magnetic sensors and an actual arrangement interval deviates from a theoretical value, the attachment error can be eliminated by using the correction coefficient φ calculated by applying a measured actual arrangement interval or an actual arrangement interval estimated by finding an attachment error from an amplitude value of a magnetic pole position error waveform to Formula (3). The troublesome correction processing in the past does not have to be performed.

The constraint due to the magnetic pole pitch (the number of poles in the rotary motor) in the past is eliminated. The two magnetic sensors can be freely arranged at an arbitrary interval. Therefore, in a magnetic pole position detecting device for an application for mounting the magnetic pole position detecting device on a linear motor, it is possible to reduce the size of the apparatus. The magnetic pole position detecting device can be shared among linear motors having different magnetic pole pitches.

In addition, because a degree of freedom for locating magnetic sensors is increased, in the magnetic pole position detecting device for the application for mounting the magnetic pole position detecting device on the linear motor, it is easy to mount three or more magnetic sensors and impart redundancy to the magnetic sensors. This makes it possible to improve detection accuracy and improve reliability.

Industrial Applicability

As explained above, the magnetic pole position detecting device according to the present invention is useful as a magnetic pole position detecting device that can correctly acquire a magnetic pole position even if two magnetic sensors are arranged at an arbitrary interval and, in particular, is suitable for an application for mounting the magnetic pole position detecting device on a linear motor.

The invention claimed is:

1. A magnetic pole position detecting device that calculates and detects, based on a phase difference between sensor outputs of two magnetic sensors among two or more magnetic sensors arranged at predetermined intervals along a magnetic pole arraying direction of a motor, a magnetic pole position where a movable unit is located, the magnetic pole position detecting device comprising:

a first operation system that detects, when an advanced phase side sensor output of the two sensor outputs is represented as "a", a delay phase side sensor output is represented as "b", and the phase difference is represented as φ, a magnetic pole position θ in the case of a sine value of the phase difference larger than a determination threshold by performing a following arithmetic operation:

$$\theta=\tan^{-1}\{a\cdot\sin\phi/(b-a\cdot\cos\phi)\}; \text{ and}$$

a second operation system that detects the magnetic pole position θ in the case of a sine value of the phase difference smaller than the determination threshold by performing a following arithmetic operation:

$$\theta=\{\sin^{-1}(a)+\sin^{-1}(b)-\phi\}/2.$$

2. The magnetic pole position detecting device according to claim 1, wherein the first operation system includes a first multiplier that multiplies the advanced phase side sensor output of the two sensor outputs by the sine value of the phase difference, a second multiplier that multiplies the advanced phase side sensor output by a cosine value of the phase difference, a first subtracter that subtracts an output value of the second multiplier from the delay phase side sensor output of the two sensor outputs, a divider that divides an output value of the first multiplier by an output value of the subtracter, and an angle operator that calculates an arctangent value of a tangent value output by the divider and outputs the arctangent value as the magnetic pole position, and the second operation system includes a second angle operator that calculates an arcsine value of the advanced phase side sensor output, a third angle operator that calculates an arcsine value of the delay phase side sensor output, a second subtracter that subtracts the phase difference from an output value of the third angle operator, an adder that adds up an output value of the second angle operator and an output value of the second subtracter, and a third multiplier that outputs, as the magnetic pole position, a value obtained by multiplying an output value of the adder by ½.

3. The magnetic pole position detecting device according to claim 1, further comprising a phase-difference calculating unit that calculates the phase difference by performing an arithmetic operation (2π× an arrangement interval of the two magnetic sensors)/(a magnetic pole pitch or a number of poles), wherein
as the arrangement interval, when there is an error in the calculated and detected magnetic pole position, an actually measured arrangement interval or an arrangement interval estimated from an amplitude value of a magnetic pole position error waveform is applied.

4. The magnetic pole position detecting device according to claim 1, wherein one or more magnetic sensors are added to the two magnetic sensors, and the magnetic pole position is detected by a combination of a plurality of the magnetic sensors.

5. A magnetic pole position detecting method comprising:
a first step of calculating a phase difference between sensor outputs of two magnetic sensors among two or more magnetic sensors arranged at predetermined intervals along a magnetic pole arraying direction of a motor by performing an arithmetic operation (2π× an arrangement interval of the two magnetic sensors)/(a magnetic pole pitch or a number of poles);

a second step of determining a magnitude relation between a sine value of the phase difference and a determination threshold;

a third step of calculating and detecting, when the sine value of the phase difference is larger than the determination threshold as a result of the determination at the second step, as a first magnetic pole position, an arctangent value of a tangent value having, as a numerator, a value obtained by multiplying an advanced phase side sensor output of the sensor outputs of the two magnetic sensors by the sine value of the phase difference and having, as a denominator, a value obtained by subtracting, from a delay phase side sensor output of the sensor outputs of the two magnetic sensors, a value obtained by multiplying the advanced phase side sensor output by a cosine value of the phase difference; and a fourth step of calculating and detecting, when the sine value of the phase difference is smaller than the determination threshold as a result of the determination at the second step, as a second magnetic pole position, a half value of a value obtained by subtracting the phase difference from a sum of an arcsine value of the advanced phase side sensor output and an arcsine value of the detail phase side sensor output.

6. The magnetic pole position detecting method according to claim 5, further comprising:
a step of actually measuring an arrangement interval of the two magnetic sensors or estimating the arrangement interval from an amplitude value of a magnetic pole position error waveform when there is an error in the calculated and detected magnetic pole position; and
a step of applying the actually measured arrangement interval or the estimated arrangement interval to the first step.

* * * * *